United States Patent [19]

Weber et al.

[11] E Patent Number: Re. 31,798

[45] Reissued Date of Patent: Jan. 8, 1985

[54] KNOCKDOWN SHADE ASSEMBLY FOR LIGHTING FIXTURE

[76] Inventors: Franz K. Weber, 15930 Royal Oak Rd., Encino, Calif. 91436; Martin R. Reed, 323 N. Maple St., Burbank, Calif. 91505

[21] Appl. No.: 409,520

[22] Filed: Aug. 19, 1982

Related U.S. Patent Documents

Reissue of:

[64] Patent No.: 4,277,822
Issued: Jul. 7, 1981
Appl. No.: 54,843
Filed: Jul. 5, 1979

[51] Int. Cl.[3] ..... F21V 1/06

[52] U.S. Cl. ..... 362/352; 362/360; 362/367; 362/450; 362/452; 362/453

[58] Field of Search ..... 362/293, 311, 317, 330, 362/332, 346, 351, 352, 353, 358, 360, 367, 374, 375, 376, 382, 391, 404, 421, 433, 434, 442, 448, 450, 452, 453, 454, 455; 248/451; 49/463, 466; 428/33

[56] References Cited

U.S. PATENT DOCUMENTS

| | | | |
|---|---|---|---|
| 566,287 | 8/1896 | Gahlau | 362/376 |
| 953,456 | 3/1910 | Bowman | 248/451 |
| 985,929 | 3/1911 | Person et al. | 362/358 |
| 1,012,460 | 12/1911 | Singleton | 362/376 |
| 1,305,130 | 5/1919 | Ledig et al. | 362/376 |
| 1,370,671 | 3/1921 | Rundell | 362/434 |
| 1,695,223 | 12/1928 | Berger | 362/434 |
| 1,791,674 | 2/1931 | King | 362/367 |
| 1,867,562 | 7/1932 | Burke | 362/352 |
| 1,872,453 | 8/1932 | Holdeman | 362/352 X |
| 3,590,237 | 6/1971 | Winters et al. | 362/367 |
| 3,757,110 | 9/1973 | Soboleski | 362/360 |
| 4,061,913 | 12/1977 | Ross | 362/352 X |
| 4,163,817 | 8/1979 | DiCarlantonio et al. | 428/33 |
| 4,165,529 | 8/1979 | Hagelthorn | 362/352 |

FOREIGN PATENT DOCUMENTS

| | | | |
|---|---|---|---|
| 1104980 | 12/1979 | Canada | 362/358 |
| 2263609 | 7/1974 | Fed. Rep. of Germany | 428/33 |
| 2334913 | 12/1975 | France | 362/358 |
| 1457442 | 12/1976 | United Kingdom | 362/358 |

*Primary Examiner*—David H. Brown
*Assistant Examiner*—John E. Griffiths, Jr.
*Attorney, Agent, or Firm*—Gene W. Arant; Paul H. Ware

[57] ABSTRACT

The shade assembly for use in a lighting fixture is characterized by a knockdown construction so that it may be easily disassembled for purpose of storage or transport. The shade assembly is in the general form of a regular polyhedron and includes a set of at least three flat trapezoidal windows arranged in a closed figure with their short sides on top and their long sides on the bottom. A base member is centrally disposed in the region above the windows. There are also a set of at least three ribs, each rib extending along the juncture of two of the windows and having its upper end removably secured to the base member. Each window is removably secured to the two adjacent ribs.

12 Claims, 8 Drawing Figures

Fig. 1.
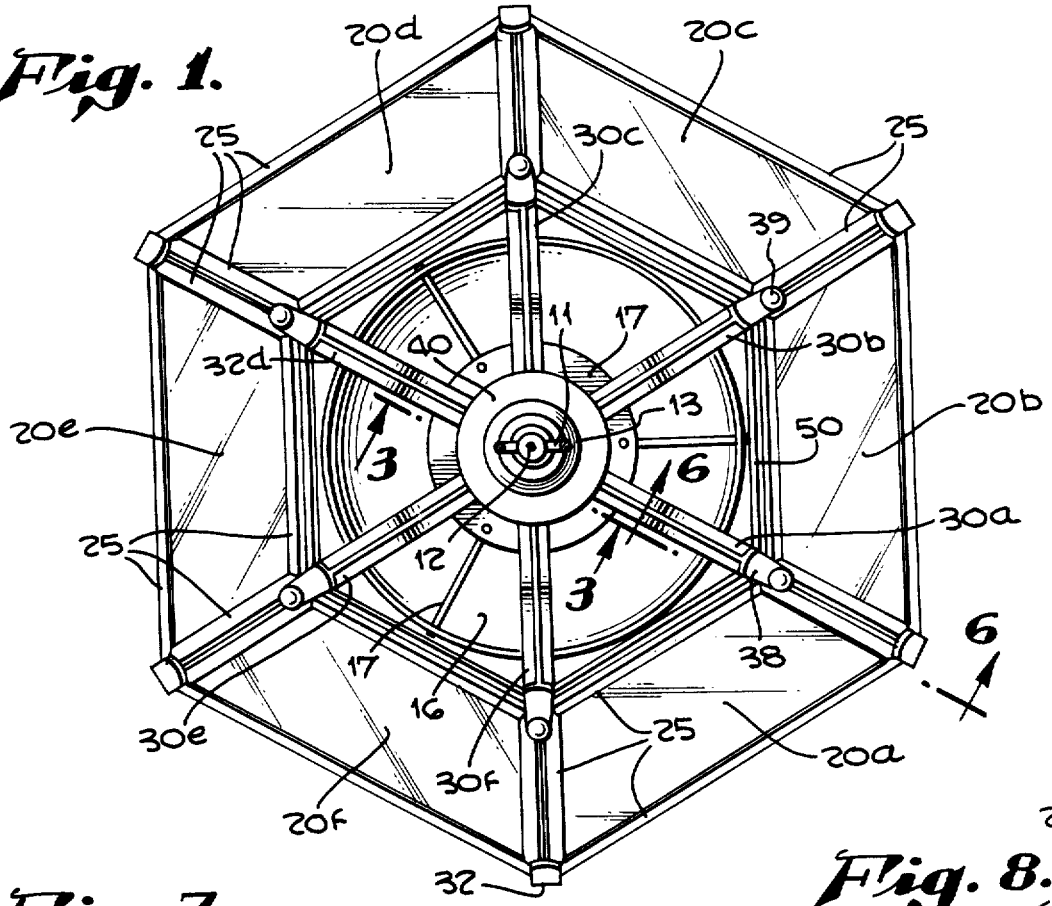
Fig. 7.
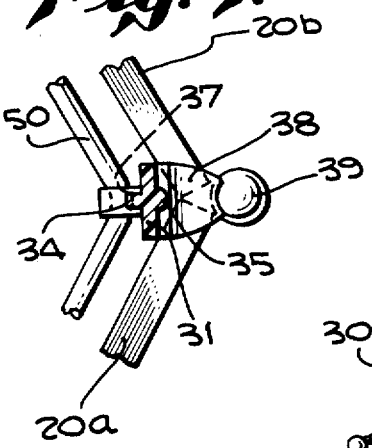
Fig. 8.
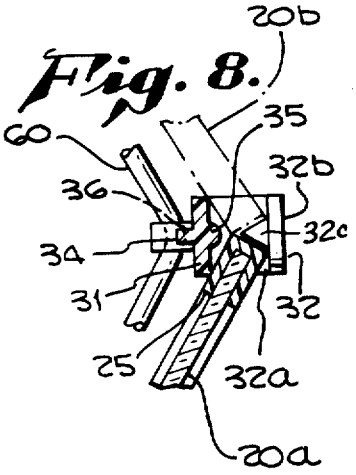
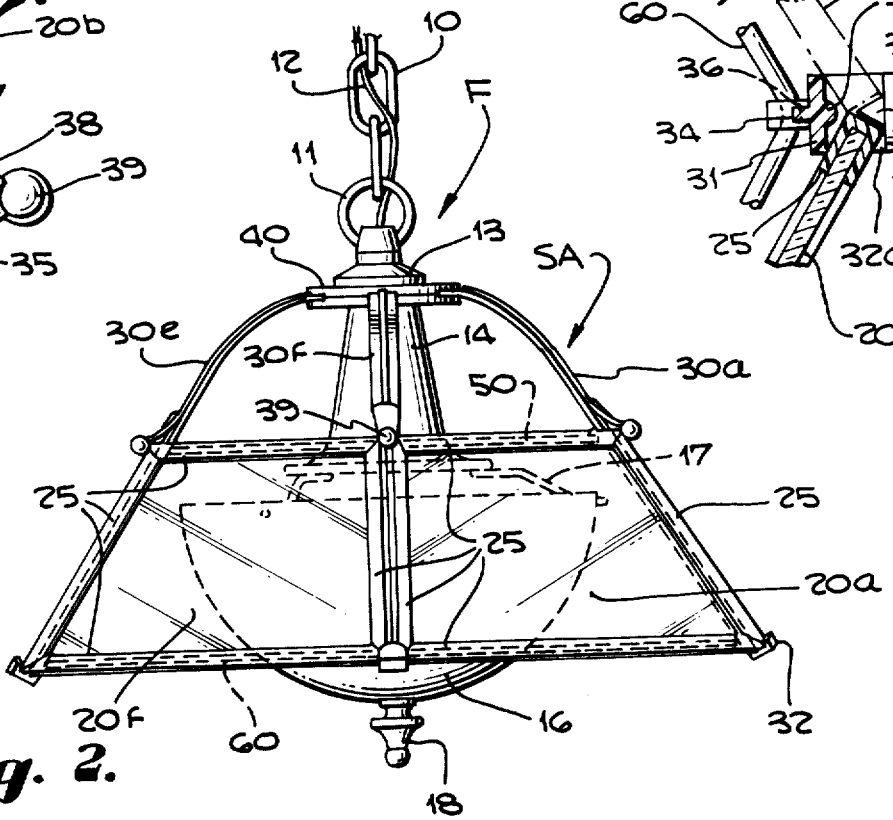
Fig. 2.

Fig. 3.
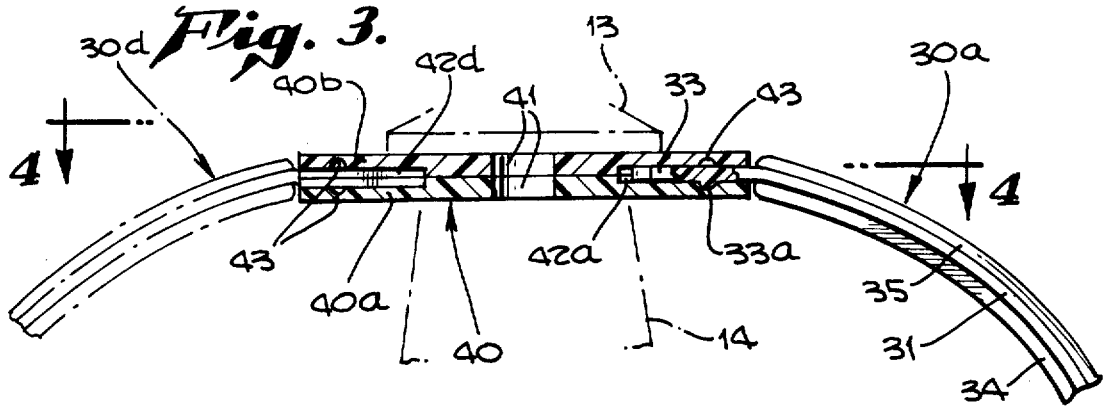
Fig. 5.
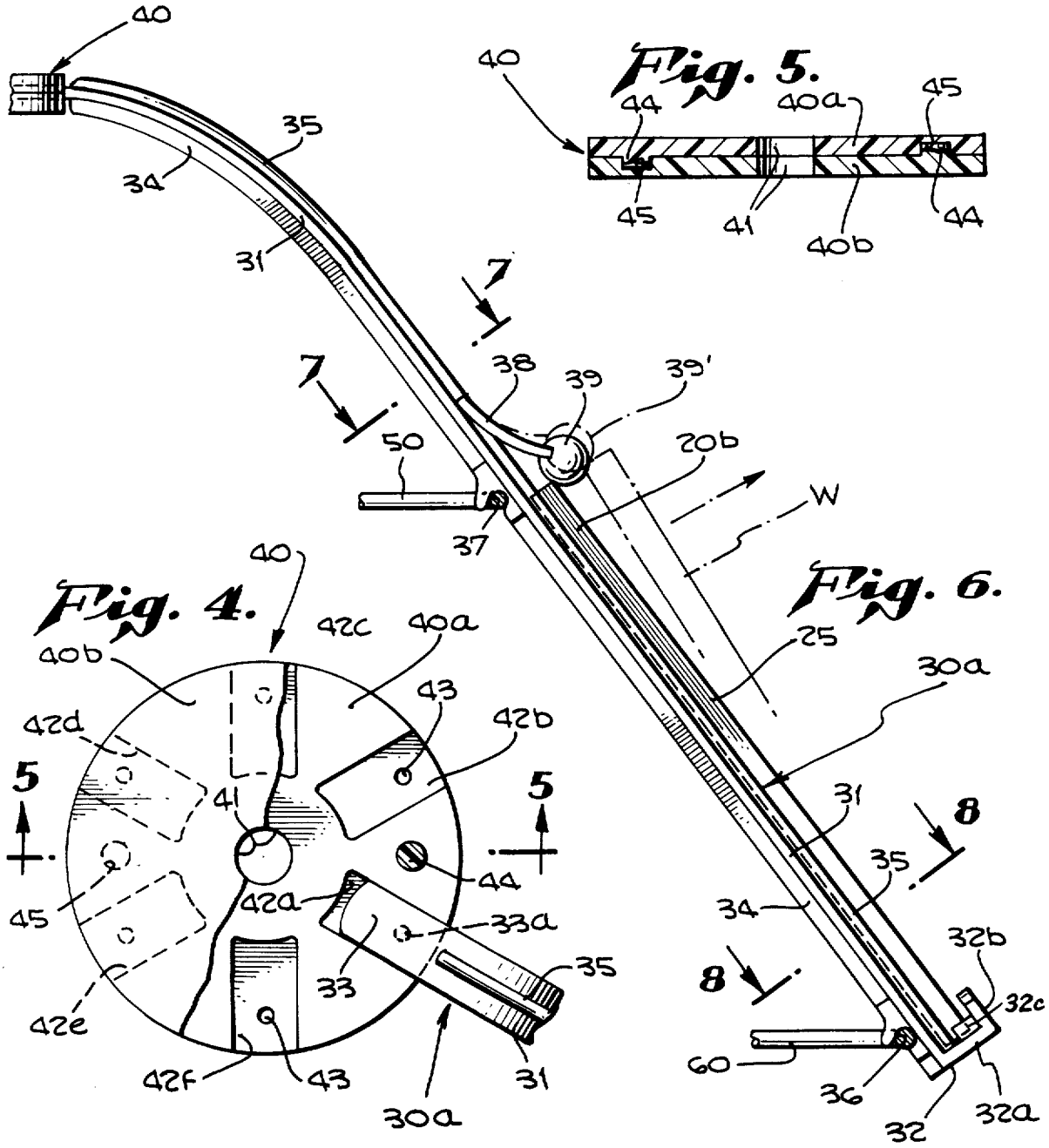
Fig. 4.

KNOCKDOWN SHADE ASSEMBLY FOR LIGHTING FIXTURE

Matter enclosed in heavy brackets [ ] appears in the original patent but forms no part of this reissue specification; matter printed in italics indicates the additions made by reissue.

BACKGROUND OF THE INVENTION

Many different designs of lighting fixtures have been manufactured and sold. It has not been a usual practice, however, to make lighting fixtures in a knockdown form such that an ordinary customer can assemble the fixture after he has purchased it. Lighting fixtures tend to be rather bulky relative to their cost or inherent worth. Furthermore, they often include delicate ornamental parts that are easily shattered or damaged. The object and purpose of the present invention is to provide a lighting fixture in knockdown form, which can be stored, transported, and sold in a very compact condition while at the same time protecting the component parts thereof from damage, and yet which can quickly and easily be assembled by an ordinary customer after he has purchased it.

SUMMARY OF THE INVENTION

According to the present invention a shade assembly for a lighting fixture is provided in the general form of a regular polyhedron. It includes at least three flat trapezoidal windows or plates[1] arranged in a closed figure with their shorter sides uppermost. It also includes an equal number of ribs, each rib extending upward along the junction of two of the windows and hence into the region above the windows. It further includes a horizontal base member located in the region above the windows. All of the ribs have their upper ends removably secured to the base member. All of the windows are removably supported from the associated ribs. The shade assembly includes support means for supporting the windows from the ribs while concurrently maintaining the spatial relationship of the ribs. The shade assembly is characterized by quite a number of attachment joints for attaching the various components together, and is further characterized by the fact that most of the attachment joints include a resilient plastic member that is snap-fitted to its mating part.

[1]The expression "or plates" did not appear in the original patent, but was added by Certificate of Correction during the pendency of the reissue application.

DRAWING SUMMARY

FIG. 1 is a top plan view of the presently preferred form of the invention;

FIG. 2 is a side elevation view of the invention;

FIG. 3 is a cross-sectional elevational view taken on line 3—3 of FIG. 1 and showing the attachment of two of the ribs to the base member;

FIG. 4 is an enlarged top plan view of the base member, partially cut away to show interior details;

FIG. 5 is a vertical cross-sectional view of the base member taken on line 5—5 of FIG. 4;

FIG. 6 is an elevational view of one of the rib structures taken on line 6—6 of FIG. 1;

FIG. 7 is a transverse cross-section of the rib taken on the line 7—7 of FIG. 6; and FIG. 8 is a transverse cross-section of the rib taken on the line 8—8 of FIG. 6.

PREFERRED EMBODIMENT

Reference is now made to the drawings illustrating the presently preferred embodiment of the invention.

A complete lighting fixture F, FIG. 2, includes a shade assembly SA which is characterized by easy assembly or disassembly, i.e., a knockdown type of construction. The operative lighting components of the complete fixture F do not in and of themselves form any part of the present invention, since they are of conventional construction. These conventional parts will be described first.

A chain 10 suspended from a ceiling or the like has a loop or chain anchor 11 attached to its bottom end. An electric cord 12 is woven through the links of the chain and extends through a central opening in the bottom of the loop 11. Immediately beneath the loop 11 is a vase cap or upper washer 13, which is positioned upon the upper surface of a base member 40 of the shade assembly SA.

Immediately beneath base member 40 is a conical housing 14 which contains the downwardly depending portion of the electrical circuit, not specifically shown. The electrical circuitry contained within the conical housing 14 includes a conventional light bulb socket which is supported at the lower end of a threaded tube. The threaded tube extends upward through a central opening in base member 40, through the center of vase cap 13, and into a threaded opening that is formed in the bottom of chain loop 11. This threaded tube and its attachments, not shown, are not only the means for providing support to a light bulb that is positioned at the lower end of conical housing 14, but also for grasping the base member 40 of the shade assembly between the vase cap 13 and conical housing 14 of the lighting structuure so that the shade assembly can be firmly supported in its proper position.

A diffuser or reflector bowl 16, shown in FIG. 2 partially in dotted lines, is positioned beneath the conical housing 14. It is supported underneath the conical housing by means of a ring and tripod assembly 17. At the lower center of the diffuser bowl a bottom ornament 18, known in the trade as a finial, is attached.

The conventional lighting structure just described may, if desired, be utilized without a shade, or for that matter may be used with a different type of shade other than what is presently illustrated. If no shade is used then the threaded tube, not shown, that is located inside the conical housing 14 is simply tightened further so as to eliminate the vertical gap that would otherwise exist between housing 14 and vase cap 13.

According to the present invention the knockdown shade assembly SA is utilized in conjunction with the conventional lighting components previously described so as to provide a complete lighting fixture. The novel shade assembly of the present invention will now be described.

The knockdown shade assembly is arranged generally in the form of a regular polyhedron having, in the present embodiment, six sides. It includes six windows **20*a* . . . 20*f* which are of a flat trapizodal configuration. Each flat trapezoidal[2] window is constructed of a single pane of glass with a plastic edge cover 25** that is of U-shaped cross-sectional configuration and extends around the entire periphery of the glass. The windows are arranged in a closed figure with their shorter sides uppermost and their longer sides extending downward.

[2]The expression "flat trapezoidal" did not appear in the original patent but was added by Certificate of Correction during the pendency of the reissue application.

A set of six identical ribs, or rib structures are each integrally formed of resilient plastic material. The ribs are designated as 30*a* to 30*f*, inclusive. Each rib extends upward along the juncture of two adjacent windows and hence into the region above the windows. Thus the lower portion of rib 30*a* extends between the juncture of windows 20*a* and 20*b*. See FIGS. 1 and 6. The upper end of rib 30*a* extends into the region above the windows and is curved into a substantially horizontal path before its attachment to the base member 40. See FIGS. 3 and 6.

Base member 40 has a flat circular configuration and is disposed in the region above the windows, but somewhat below the apex of a mathematically perfect polyhedron or pyramid that would have been formed if the flat windows had all been extended upwardly to such apex. The upper ends of all of the ribs are removably secured to the base member.

Specific structural details of the rib will now be described with reference to rib 30*a*, some portion of which is shown in all of the drawing figures except FIG. 5. The rib includes an elongated flat beam 31 having its lower end formed into an outwardly turned hook 32*a*, 32*b*. The upper end of beam 31 is bent or curved in a direction away from the hook through an angle of about 50 degrees. The reason for this curvature is that the extreme upper end or attachment portion 33 of the rib is horizontal, while the straight lower end portion of the ribs supports each of the windows 20*a*, 20*b* at an angle of about 40 degrees to the vertical.

The rib has an elongated central ridge 34 formed on its inner side and an elongated central ridge 35 formed on its outer side, both of these ridges running the full length of the rib between the attachment end 33 and the hook end 32. The inner ridge 34 has a transverse lower latch opening 36 formed therein opposite the hook 32. This latch opening is formed with an arcuate wall that curves through an angle of about 185 degrees, so as to receive and retain in a snap fitting relationship a lower brace member 60 that is preferably made of metal and has a circular cross-sectional configuration. See FIG. 6.

The inner ridge 34 has an upper latch opening 37 formed therein about midway of the length of the rib structure. The upper latch opening is constructed identically to the lower latch opening and receives an upper brace 50 in snap-fitting relationship. One purpose of the inner and outer ridges 34, 35 is to add to the strength of the rib structure.

A short finger 38, see FIGS. 6 and 7, extends outward from the beam 31 at a location above the upper latch opening 37. The finger 38 is curved slightly throughout its length, is attached at its upper end to the beam 31 in substantially parallel relationship therewith, and at its lower end is curved outward, and spaced away from the beam 31. A plastic ball or sphere 39 is attached to the lower end of finger 38. Ball 39 is located directly opposite the upper latch opening 37.

Upper brace 50 is made of a single metal wire piece bent into a hexagonal configuration and having its ends fused together. Lower brace 60 is similarly formed, but is of larger diameter, since it supports the ribs at their lowermost ends rather that at their vertical centers.

Base member 40 includes a lower plate 40*a* and an upper plate 40*b* which are of identical construction. As best seen in FIG. 4 the lower plate 40*a* has a small circular central opening 41. It also has six shallow, radially aligned rectangular slots 42*a* . . . 42*f* formed in its upper surface. A small depression or recess 43 is associated with the approximate center of each of the slots. Located between slots 42*a*, 42*b* is a pin or stub shaft 44 which protrudes upwardly. On its directly opposite side, on the same upper surface, the lower plate 40*a* has a complementary recess or hole 45 formed therein for receiving the pin or stub shaft 44 of the upper plate 40*b*.

It will therefore be seen that when the upper and lower plates are inverted relative to each other, and rotated 90 degrees relative to each other, the pin 44 of one fits into the recess 45 of the other, and vice versa, and at the same time the six grooves of the two plates match up so as to form six radially aligned openings. Attachment portion 33 of the rib structure has a small bump or protrusion 33*a* formed on its lower surface, and this bump or protrusion fits into a corresponding recess 43 of the lower plate of the base member 40. It will be seen that when the two halves of the base member are tightly held together between chain anchor 11 and conical housing 14, that they firmly grasp the upper ends 33 of all of the rib structures in a secure but removable attachment thereto.

ASSEMBLY PROCEDURE

An important aspect of the invention is that the entire shade assembly may be assembled by hand, and no tools, special or otherwise, are required. The two halves of the base member 40 are first cemented together. The upper or fastening ends of the ribs are then slidably inserted into the corresponding slots. Protrusion 33*a* snaps into recess 43, securing the rib in place.

The next step is to insert the upper brace 50 and the lower brace 60 into the corresponding latch sockets of the ribs. This step provides a complete frame for supporting the windows.

It is preferred that the frame assembly be placed in its supporting relationship within the electrical circuit structure before the windows are attached. The risk of damaging the windows is probably lessened by inserting them into the assembly as the very last step.

Each window is inserted as follows. Its lower side being also its longer side, is placed within the two hooks 32 of the associated rib structures. The upper portion of the window is then permitted to lean inwards towards the ribs as shown by dotted lines W in FIG. 6. At this time the longitudinal positions of the top ends of the windows are determined by V-shaped protrusions 32*c* in the respective hooks 32. See FIGS. 6 and 8. At this time the upper sides of the windows do not fall into engagement with the ribs because they are prevented from doing so by the balls 39 of the associated ribs. Again, see FIG. 6.

A slight inward pressure is now exerted against the upper side of the window. Since the upper side of the window bears against the upper surface of the ball 39, the pressure causes the ball to move upward to the position shown by dotted lines 39' rather than moving inward towards the rib. When the upper side of the window moves into full engagement with the ribs, then the resilient finger 38 snaps back into place and the ball 39 locks the upper corner of the window in position.

It will of course be realized that each finger 38 with its associated ball 39 serves to capture the upper corners of two of the windows. FIG. 6 illustrates the snap-fastening operation only with respect to one of the windows, but it is identical with respect to the other. It is true, of course, that the finger 38 being flat configuration bends in the same vertical plane as is occupied by the ridges of the associated rib, while each of the adjacent windows pivots through its own separate plane that differs by 30 degrees from the orientation of the plane in which the bending movement of the finger 38 takes place. Nevertheless, the action is substantially as illustrated in FIG. 6.

ALTERNATE FORMS

While it is presently preferred to utilize a hexagonal configuration of our shade assembly, with six windows, it is also possible to construct the shade assembly with three windows or any larger number than three.

The upper and lower braces 50, 60 have the advantage of being located at approximately the same elevations as the corresponding portions of the border 25 on each window, and hence do not obstruct the view or appearance of the windows. However, in accordance with the invention windows that are fully or partially opaque may be used if desired, and it may then be desired to utilize braces that are differently located, or differently shaped, or perhaps a single brace in lieu of two separate braces.

Windows of material other than glass may be used if desired.

The presently preferred form of base member 40 is illustrated herein, but the base member may if desired be constructed in other ways, and yet have the upper ends of the ribs removably attached thereto.

Specific features of the rib structure have been illustrated which serve to retentively receive[3] an upper and lower brace[3] with a snap fastening action, to provide vertical support for the windows through the hooks on the lower ends of the ribs, to provide longitudinal positioning for the windows through the external ribs on the braces, and to provide retention of the upper sides of the windows through the flexible fingers of their associated balls. It will be understood, however, that the scope of the present invention is not to be limited to the specific details of the presently illustrated embodiment, but also includes equivalent arrangements for achieving the same results.

[3]The expression "receive" and "brace" did not appear in the original patent, but was added by Certificate of Correction during the pendency of the reissue application.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. In a lighting fixture, an easily disassembled shade assembly comprising, in combination:

a flat horizontally disposed base member having a central opening for receiving electrical circuit means extending vertically downward therethrough, and also having a plurality of slots[4] circumferentially spaced about its outer edge and extending radially inward therefrom;

a plurality of elongated ribs, one for each of said slots[4] each rib having an inner end extending into the associated slot[5] and releasably secured therein, the rib extending radially outward from said base member, bending downward through an angle of about 50°, and having a straight outer end portion;

a polygonal brace member having a number of straight sections equal to the number of said ribs, said brace member being horizontally disposed, positioned beneath said base member, and located inside the straight portions of said ribs with each apex of said brace member being releasably secured to the interior and underside of an associated one of said ribs; and a plurality of flat trapezoidal windows, each of said windows being disposed between two adjacent ribs and each end of each window being aligned with the associated rib on the exterior side thereof;

said plurality of windows collectively forming a regular polyhedron surrounding the lower ends of said ribs;

the vertical height of said windows being less than the vertical height of said ribs, thereby leaving a vertical open space above said windows and below said base member.

[4]The expression "slots" did not appear in the original patent, but was added by Certificate of Correction during the pendency of the reissue application.

[5]The expression "slot" did not appear in the original patent, but was added by Certificate of Correction during the pendency of the reissue application.

2. In a shade assembly for a lighting fixture, an elongated rib structure integrally formed of resilient plastic material, comprising:

an elongated flat substantially linear beam having inner and outer sides, an elongated central ridge on its outer side, and an outwardly turned hook forming a lower end thereof;

a short finger protruding from the outer side of the upper end of said beam, said finger extending towards said hook at an angle of about 45° to said beam;

a ball secured to the outer end of said finger, said ball and the outer part of said hook being substantially equidistant from said beam;

said beam having an elongated central ridge on its inner side, said inner ridge having transverse latch openings[6] opposite both said hook and said ball, each of said latch openings[6] being arcuately curved through more than 180; and an elongated extension of the upper end of said beam, said beam extension being curved through an angle of about 50° in a direction away from said finger.

[6]The expression "latch openings" did not appear in the original patent, but was added by Certificate of Correction during the pendency of the reissue application.

3. In a snap-together shade assembly for a lighting fixture, the combination comprising:

an elongated resilient plastic rib member having two longitudinal spaced protrusions thereon, one of said protrusions being a hook and the other of said protrusions being finger extending toward said hook at an angle of about 45° to the member;

a ball secured to the outer end of said finger; and a flat trapezoidal window[7] adapted to be removably supported upon said elongated member between said protrusions;

whereby one edge of said trapezoidal window[7] may first be brought into engagement with said hook, and then the other edge of said trapezoidal window[7] may be forced against said ball so as to snap between said ball and said member when said finger flexes in response to the force applied to said ball.

[7]The expression "trapezoidal window" did not appear in the original patent, but was added by Certificate of Correction during the pendency of the reissue application.

4. The apparatus of claim 3 wherein said elongated resilient plastic member has an elongated central ridge on the side thereof opposite said hook and said finger, said central ridge having at least one transverse latch opening with an arcuate wall curved through more than 180°.

5. The apparatus of claim 3 wherein said elongated resilient plastic member has an elongated central ridge extending between said short finger and said hook.

6. Apparatus as claimed in claim 5 wherein said hook has an interior V-shaped protrusion disposed opposite said central ridge.

7. In a snap-together shade assembly for a lighting fixture, apparatus comprising, in combination:

an elongated resilient plastic rib member having a lower end upon which an outwardly turned hook is formed, and also having a finger spaced longitudinally above said hook and extending toward said hook at an angle of about 45° to said rib member;

a ball secured to the outer end of the finger, said ball and said hook being substantially equidistant from said rib member; and a pair of flat trapezoidal windows[8] having mating ends adapted to be removably supported upon said rib member intermediate to said hook and said finger;

said hook being of sufficient width in a direction perpendicular to the plane of said finger to receive a corner portion of each of said trapezoidal windows[8]; and the other corners of the mating ends of said trapezoidal windows[8] being adapted to snap underneath said ball in engagement with said rib member, being retained there by resilient outward deflection of said finger.

[8]The expression "trapezoidal windows" did not appear in the original patent, but was added by Certificate of Correction during the pendency of the reissue application.

8. The apparatus of claim 7 wherein said elongated resilient plastic member has an elongated central ridge on the side thereof opposite said hook and said finger, said central ridge having at least one transverse latch opening with an arcuate wall curved through more than 180°.

9. The apparatus of claim 7 wherein said elongated resilient plastic member has an elongated central ridge extending between said short finger and said hook.

10. Apparatus as claimed in claim 7 wherein said hook has an interior V-shaped protrusion disposed opposite said central ridge.

*11. A snap-together frame for supporting the shade of a lighting fixture comprising in combination:*

*a plastic base member formed by cementing identical upper and lower plates together, each having a stub shaft and a recess for receiving said stub shaft so as to effect proper orientation of one plate with respect to the other;*

*a central opening in said plastic base member;*

*a plurality of radially extending slots in said plastic base member, each slot having an internal recess therein;*

*a plurality of elongated ribs made of resilient plastic material, each of said ribs having an upper attachment portion adapted to be slideably inserted into one of said plurality of radially extending slots, and a lower portion, said upper attachment portion having a protrusion adapted for snap locking engagement with the internal recess in said slot and also having an internal angular disposition of greater than 90° with respect to the lower portion thereof so that when said ribs are thus inserted their lower portions depend downwardly relative to the plane of said plastic base member;*

*each of said ribs also having first and second notches on its underside, each of said notches having an arcuate surface extending through an arc of greater than 180 degrees;*

*a first metal brace adapted for snap fit insertion into a first latch opening of each said ribs; and*

*a second metal brace adapted for snap fit insertion into a second latch opening of each of said ribs.*

*12. A snap-together frame for supporting the shade of a lighting fixture comprising in combination:*

*a plastic base member formed by cementing upper and lower plates together;*

*a central opening in said plastic base member;*

*at least one radially extending slot in said plastic base member, said slot having an internal recess therein;*

*at least one elongated rib made of resilient plastic material, said rib having an upper attachment portion adapted to be slideably inserted into said radially extending slot, and having a protrusion adapted for snap locking engagement with the internal recess in said slot;*

*said rib also having a lower portion, said upper attachment portion having an angular disposition of greater than 90° with respect to said lower portion;*

*said rib also having first and second latch openings on its underside, each of said latch openings having an arcuate surface extending through an arc of greater than 180 degrees; and*

*at least one metal brace adapted for snap fit insertion into said first latch opening of said rib.*

* * * * *